(12) United States Patent
Kamvysselis

(10) Patent No.: US 10,366,382 B2
(45) Date of Patent: Jul. 30, 2019

(54) SYSTEM AND METHOD FOR PROCESSING ORDERS

(71) Applicant: Vendsy, Inc., Mountain View, CA (US)

(72) Inventor: Peter Kamvysselis, Santa Monica, CA (US)

(73) Assignee: Vendsy, Inc., Mountain View, CA (US)

( * ) Notice: Subject to any disclaimer, the term of this patent is extended or adjusted under 35 U.S.C. 154(b) by 197 days.

(21) Appl. No.: 15/453,423

(22) Filed: Mar. 8, 2017

(65) Prior Publication Data

US 2017/0178109 A1  Jun. 22, 2017

Related U.S. Application Data

(63) Continuation of application No. 14/451,833, filed on Aug. 5, 2014.

(60) Provisional application No. 61/896,350, filed on Oct. 28, 2013.

(51) Int. Cl.
| | |
|---|---|
| *G06Q 20/00* | (2012.01) |
| *G06Q 20/20* | (2012.01) |
| *G06Q 30/06* | (2012.01) |
| *G06F 3/12* | (2006.01) |
| *G06Q 50/12* | (2012.01) |

(52) U.S. Cl.
CPC ......... *G06Q 20/209* (2013.01); *G06F 3/1243* (2013.01); *G06F 3/1285* (2013.01); *G06Q 20/20* (2013.01); *G06Q 20/202* (2013.01); *G06Q 30/06* (2013.01); *G06Q 30/0635* (2013.01); *G06Q 50/12* (2013.01)

(58) Field of Classification Search
CPC .................................................... G06Q 20/00
USPC ...................................... 705/17, 24; 235/380
See application file for complete search history.

(56) References Cited

U.S. PATENT DOCUMENTS

| | | | |
|---|---|---|---|
| 5,504,589 A | 4/1996 | Montague et al. | |
| 5,573,082 A | 11/1996 | Conlan et al. | |
| 6,529,214 B1 | 3/2003 | Chase et al. | |
| 6,543,684 B1* | 4/2003 | White | G06F 3/04886 235/379 |
| 6,880,750 B2* | 4/2005 | Pentel | G06Q 20/206 235/380 |
| 7,107,240 B1 | 9/2006 | Silverman et al. | |

(Continued)

FOREIGN PATENT DOCUMENTS

| | | |
|---|---|---|
| GB | 2297009 A | 7/1996 |
| JP | H09218618 A | 8/1997 |

(Continued)

OTHER PUBLICATIONS

Flashpoint™ Operations Guide, Using the Credit Card Interface. FlashPoint Operations Guide. © 2013 TRIM-P.O.S. Software Corp. [Retrieved on Sep. 24, 2015]. Retrieved from the Internet: <URL: http://www.trimpos.net/Ver16/Docs/Credit%20Card%Interface.pdf> entire document.

(Continued)

*Primary Examiner* — Oluseye Iwarere
(74) *Attorney, Agent, or Firm* — Lerner, David, Littenberg, Krumholz & Mentlik, LLP

(57) ABSTRACT

Aspects of the disclosure relate generally to an order processing system that receives and prints orders and provides an indication of the number of the orders that have been printed and are awaiting acknowledgment by a user.

5 Claims, 5 Drawing Sheets

(56) References Cited

U.S. PATENT DOCUMENTS

| | | | |
|---|---|---|---|
| 8,150,737 B2* | 4/2012 | Lutnick | G06Q 30/02 |
| | | | 705/26.1 |
| 8,452,667 B1 | 5/2013 | Shimoff et al. | |
| 2002/0143655 A1 | 10/2002 | Elston et al. | |
| 2002/0156682 A1 | 10/2002 | DiPietro | |
| 2003/0050854 A1 | 3/2003 | Showghi et al. | |
| 2003/0074254 A1 | 4/2003 | Iijima | |
| 2004/0006487 A1 | 1/2004 | Tari | |
| 2004/0039647 A1 | 2/2004 | Roche | |
| 2004/0054592 A1* | 3/2004 | Hernblad | G06Q 20/32 |
| | | | 705/15 |
| 2004/0098664 A1 | 5/2004 | Adelman et al. | |
| 2004/0117268 A1 | 6/2004 | Grogan et al. | |
| 2004/0257616 A1 | 12/2004 | Kawaoka et al. | |
| 2005/0015301 A1 | 1/2005 | Johnson | |
| 2005/0057775 A1 | 3/2005 | Iriuchijima | |
| 2005/0189420 A1 | 9/2005 | Chen et al. | |
| 2005/0209963 A1 | 9/2005 | Momose | |
| 2006/0178943 A1 | 8/2006 | Rollinson et al. | |
| 2006/0261149 A1* | 11/2006 | Raghavendra Tulluri | |
| | | | G07F 19/20 |
| | | | 235/379 |
| 2007/0069013 A1* | 3/2007 | Seifert | G06Q 20/0453 |
| | | | 235/383 |
| 2008/0147514 A1 | 6/2008 | Shuster et al. | |
| 2008/0262972 A1 | 10/2008 | Blake | |
| 2008/0270402 A1 | 10/2008 | Inoue et al. | |
| 2008/0278750 A1 | 11/2008 | Lehotsky et al. | |
| 2009/0091592 A1* | 4/2009 | Bich | B41J 2/1606 |
| | | | 347/9 |
| 2009/0259557 A1* | 10/2009 | Carroll | G06Q 20/20 |
| | | | 705/17 |
| 2010/0005003 A1 | 1/2010 | Cassaday et al. | |
| 2011/0119156 A1* | 5/2011 | Hwang | G06Q 20/12 |
| | | | 705/26.41 |
| 2011/0127200 A1 | 6/2011 | Han | |
| 2011/0173549 A1* | 7/2011 | Hipskind | G06Q 20/1085 |
| | | | 715/756 |
| 2011/0240729 A1 | 10/2011 | Schuck | |
| 2013/0151344 A1 | 6/2013 | Tavares et al. | |
| 2013/0151355 A1* | 6/2013 | Abromovitz | G06Q 20/40 |
| | | | 705/15 |
| 2013/0151358 A1 | 6/2013 | Ramalingam | |
| 2013/0163052 A1 | 6/2013 | Yamaguchi et al. | |
| 2014/0058861 A1 | 2/2014 | Argue et al. | |
| 2014/0058869 A1 | 2/2014 | Argue et al. | |
| 2014/0074675 A1* | 3/2014 | Calman | G06Q 40/12 |
| | | | 705/35 |
| 2014/0095985 A1* | 4/2014 | Argue | G06Q 20/0453 |
| | | | 715/243 |
| 2014/0180805 A1 | 6/2014 | Argue et al. | |
| 2014/0244408 A1 | 8/2014 | Grubel, Jr. et al. | |
| 2014/0258051 A1* | 9/2014 | Bostwick | G06Q 20/203 |
| | | | 705/28 |
| 2014/0280635 A1 | 9/2014 | Bengochea et al. | |
| 2014/0344711 A1* | 11/2014 | Hallerstrom Sjostedt | |
| | | | H04L 51/22 |
| | | | 715/752 |
| 2014/0351713 A1 | 11/2014 | Hallerstrom Sjostedt et al. | |
| 2015/0025983 A1* | 1/2015 | Cicerchi | G06Q 50/12 |
| | | | 705/15 |
| 2015/0317642 A1* | 11/2015 | Argue | G06Q 30/018 |
| | | | 705/317 |
| 2015/0332243 A1 | 11/2015 | Kamvyselis | |
| 2016/0179451 A1* | 6/2016 | Blakely | G06F 3/1204 |
| | | | 455/420 |
| 2016/0244311 A1* | 8/2016 | Burks | B67D 1/0888 |
| 2016/0314516 A1* | 10/2016 | Garrison | G06Q 30/0635 |
| 2017/0178109 A1* | 6/2017 | Kamvysselis | G06Q 30/06 |

FOREIGN PATENT DOCUMENTS

| | | |
|---|---|---|
| JP | H09325870 A | 12/1997 |
| JP | 2003044940 A | 2/2003 |
| JP | 2005074848 A | 3/2005 |
| JP | 4007733 B2 | 11/2007 |
| WO | 2012117220 A1 | 9/2012 |

OTHER PUBLICATIONS

PCT Notification of Transmittal of the International Search Report and the Written Opinion of the International Searching Authority, or the Declaration, dated Oct. 26, 2015, 10 pages.

* cited by examiner

321 — Restaurant
22 Broadway Avenue
New York, NY, 10040
Order Number: 1
Table Number: 10
Customer: John Doe
Ordered Item(s):
 - Cranberry Juice
522 — Restaurant
22 Broadway Avenue
New York, NY, 10040
Order Number: 2
Table Number: 22
Customer: John Smith
Ordered Item(s):
 - Beer
523 — Restaurant
22 Broadway Avenue
New York, NY, 10040
Order Number: 3
Table Number: 31
Customer: Jane Smith
Ordered Item(s):
 - Vodka Tonic
FIGURE 5
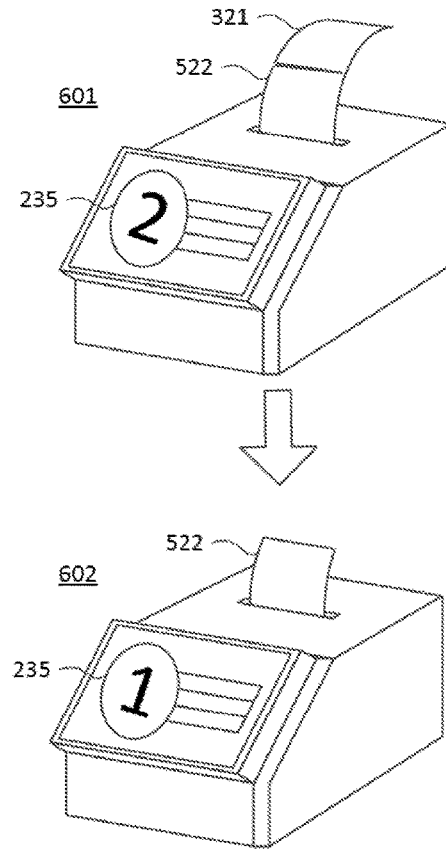
FIGURE 6
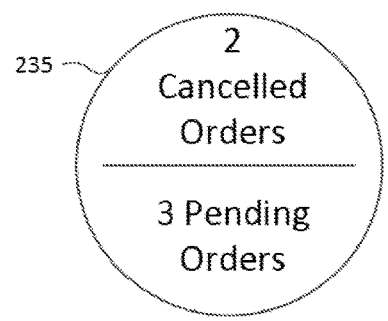
FIGURE 7

SYSTEM AND METHOD FOR PROCESSING ORDERS

CROSS-REFERENCE TO RELATED APPLICATIONS

The present application is a continuation of U.S. patent application Ser. No. 14/451,833, filed on Aug. 5, 2014, which claims the benefit of the filing date of U.S. Provisional Patent Application No. 61/896,350 filed Oct. 28, 2013, the disclosures of which are hereby incorporated herein by reference.

BACKGROUND

As all areas of technology continue to improve and become available in many parts of society, the ability to easily and efficiently facilitate and manage point of sale ("POS") transactions is possible. For example, in a POS environment customers want a system to place an order for an item and then receive the order with little hassle. These POS environments may include department stores, bars, restaurants, or any other type of stores that facilitate a purchasing transaction between a customer and a business.

SUMMARY

A method is provided that relates to receiving an order at a system that includes a computing device and a printer. The method may include printing the order received at the system, displaying, on a display of the system, an indication of the printed order, and receiving, at the system, an acknowledgement of the indication of the printed order.

In another aspect, a system is provided that includes a printer, a display, and a computing device in communication with the printer and display. The computing device may include a processor and instructions executable by the processor. The instructions may include: receiving an order at the system; printing the received order on the printer; displaying, on the display, an indication of the printed order; and receiving, on the computing device, an acknowledgment of the indication of the printed order.

In still another aspect, a system is provided that includes a computing device capable of communication with a printer and a network. The computing device may include a display, a user interface, a printer, a processor, and a memory containing instructions executable by the processor. The instructions may include: receiving identification of a product via the network; printing a receipt describing the product; receiving an acknowledgment via the user interface; and displaying an indication of the number of receipts that have been printed but have not been acknowledged via the user interface.

BRIEF DESCRIPTION OF THE DRAWINGS

FIG. 5 is an example of a plurality of printed receipts in accordance with aspects of the disclosure.

FIG. 6 is an example of an order processing unit operating in accordance with aspects of the invention.

FIG. 7 is an example of an indicator of order status in accordance with aspects of the invention.

DETAILED DESCRIPTION

In some aspects of the disclosed system and method, an order may be placed directly by a user by transmitting it to a system that prints a receipt of the order. The receipt may identify the particular customer that placed the order and the items that the customer ordered. When the printer prints the receipt, a display connected or proximate to the printer may display an indication that an order is awaiting acknowledgment. The employee may acknowledge an order via a user interface, such as by clicking on a button that may be displayed on the display of the system.

If another order is received by the system before a pending order is acknowledged, the system may indicate that multiple orders are pending, such as by displaying how many orders are awaiting acknowledgment. If the order is not acknowledged within a certain amount of time, the order may be cancelled and the display adjusted accordingly. Each receipt may be removably attached to the immediately preceding receipt. The employee may acknowledge less than all of the pending orders, and detach only the orders that the employee acknowledges.

Figure 1:
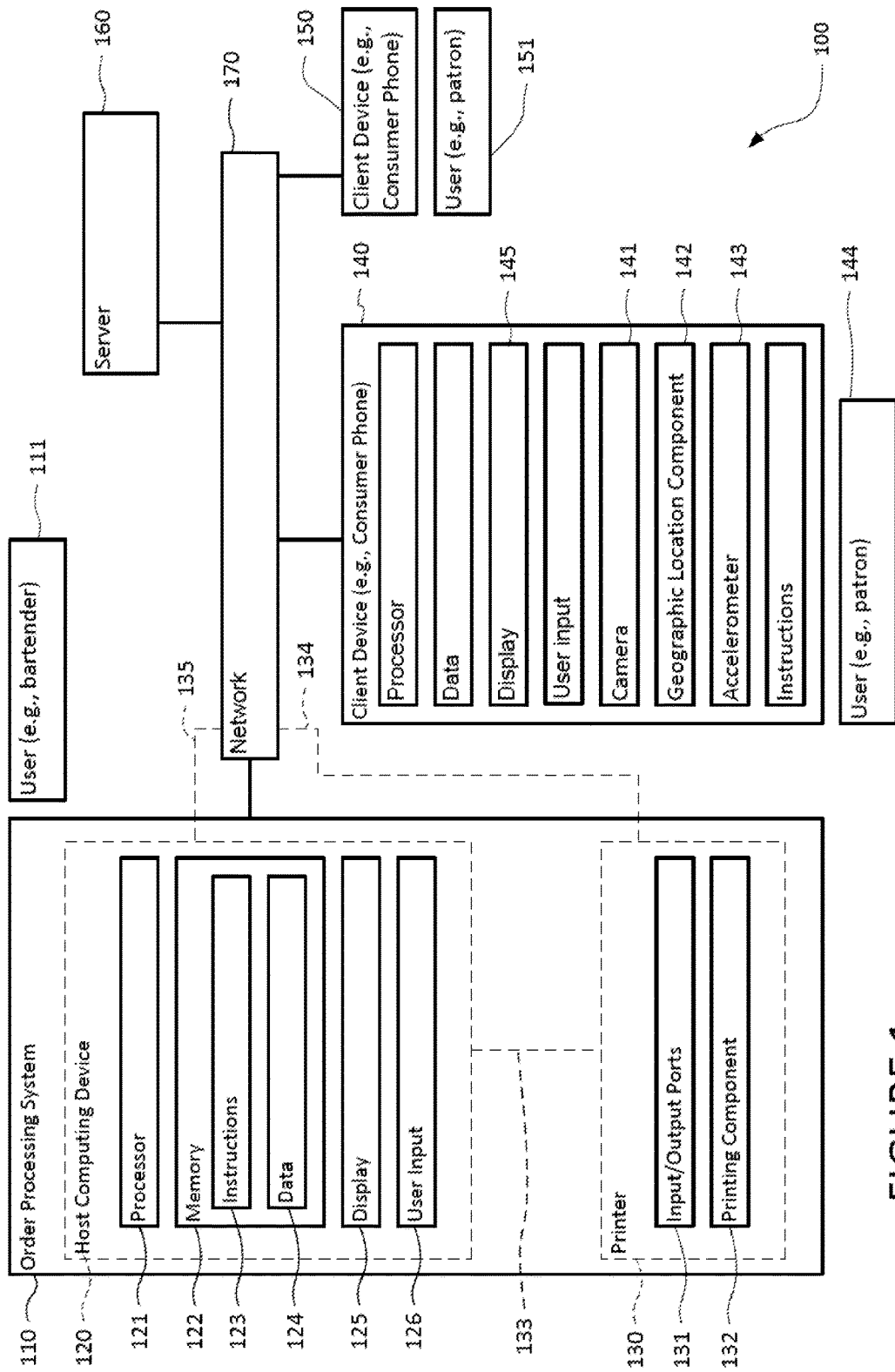
FIG. 1 is a functional diagram of an example system in accordance with aspects of the disclosure.

As shown in FIG. 1, system 100 may include computing systems 110, 140, 150 and 160. System 110 may include a host computing device 120 and a printer 130. The host computing device 120 may include a processor 121, memory 122 and other components typically present in general purpose computing devices. Memory 122 of computing device 120 may store information accessible by processor 121, including instructions 123 that may be executed by the processor 121.

Memory 122 may also include data 124 that may be retrieved, manipulated or stored by the processor. The memory may be of any type capable of storing information accessible by the processor, such as a hard-drive, memory card, ROM, RAM, DVD, CD-ROM, write-capable, and read-only memories. The memory may include a distributed storage system where data is stored on a plurality of different storage devices which may be physically located at the same or different geographic locations.

The instructions 123 may be any set of instructions to be executed directly, such as machine code, or indirectly, such as scripts, by the processor. In that regard, the terms "instructions," "application," "steps" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

Data 124 may be retrieved, stored or modified by processor 121 in accordance with the instructions 123. For instance, although the subject matter described herein is not limited by any particular data structure, the data may be stored in computer registers, in a relational database as a table having many different fields and records, or XML documents. The data may also be formatted in any computing device-readable format such as, but not limited to, binary values, ASCII or Unicode. Moreover, the data may comprise any information sufficient to identify the relevant information, such as numbers, descriptive text, proprietary codes, pointers, references to data stored in other memories such as at other network locations, or information that is used by a function to calculate the relevant data.

The processor 121 may be any conventional processor, such as a commercially available CPU. Alternatively, the processor may be a dedicated component such as an ASIC or other hardware-based processor.

The computing device 120 may be at one node of a network 170 and capable of directly and indirectly communicating with other nodes of network 170. Although only a few computing devices are depicted in FIG. 1, a typical system may include a large number of connected computing devices, with each different computing device being at a different node of the network 170. The network 170 and intervening nodes described herein may be interconnected using various protocols and systems, such that the network may be part of a local wireless network, the Internet, specific intranets, or wide area networks. The network may utilize standard communications protocols, such as Wi-Fi, Ethernet, and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Host computing device 120 may be a mobile computing device capable of wirelessly exchanging data over a network. By way of example only, each client computing device may be a mobile phone, a tablet, a tablet PC, or a wearable computing device. As an example, the user may input information via user input 126, such as by touch screen, keyboard, microphone, or camera. In another example, the host computing device 120 may be a full-sized personal computer.

Order processing system 110 may also include a printer 130. The printer 130 may include a processor, memory, instructions, and data, which may perform similarly as described above with respect to computing device 120. The printer 170 may also include input and output ports to receive and send data from and to computing devices, such as host computing device 120. The printer may include a printing component 132, e.g., an ink-jet or laser capable of printing information on paper. Printer 130 may be a typical, stand-alone receipt printer. The printer may further include a cutter to automatically cut paper upon which the printer prints.

Printer 130 may communicate wirelessly with host computing device 120. For instance, the connection may be a direct connection 133 such as by wire or wirelessly (e.g., by Bluetooth). The printer 130 may be a Wi-Fi-capable printer, and device 120 may be configured with the IP address of the printer, and transmit printing instructions to the printer at that IP address. In that regard, device 120 and printer 130 may communicate via Wi-Fi connections 134 and 135.

Each of the client computing devices may be configured similarly to the computing device 120, with a processor, memory, instructions and user input as described above. For instance, client computing devices 140 and 150 may be personal computing devices intended for use by users 144 and 151, such as a cell phone or tablet. Client computing devices 140 and 150 may have all of the components normally used in connection with a personal computing device such as a central processing unit (CPU), memory storing data and instructions, a display such as display 145 (e.g., a monitor having a screen, a touch-screen, a projector, a television, or other device that is operable to display information), and user input device 134 (e.g., a mouse, keyboard, touch screen, microphone, etc.). The client computing device may also include a camera for recording video streams, speakers, a network interface device, and all of the components used for connecting these elements to one another. The computing devices may be configured to operate with an operating system such as Apple's iOS or Google's Android operating system. In that regard, some of the instructions executed during the operations described herein may be provided by the operating system whereas other instructions are provided by an application installed on the computing device.

The computing devices 110, 140 and 150 may be client devices that exchange data with a server 160 over a network such as the Internet. For instance, in one aspect, the client devices may receive menu information from server 160, transmit their order to server 160, and server 160 may then send the order to host computing device 120. Server 160 may also receive order acceptances from computing device 120, and charge a customer's financial account (e.g., credit card) by accessing the customer's account information on server 160. Server 160 may be an HQ server. Computing devices 150 and 160 may also communicate directly with order processing system 110 without accessing server 160.

Client computing devices 120, 140 and 150 may also include a geographic position component 142 in communication with the client computing device's processor for determining the geographic location of the device. For example, position component 142 may include a GPS receiver to determine the device's latitude, longitude and/or altitude position. The client computing device's location may also be determined using one or more localizing techniques, such as cellular tower triangulation, IP address lookup, Wi-Fi SSID lookup (e.g., querying a database that maps Wi-Fi SSIDs to geographic positions), a Wi-Fi positioning system or other techniques, all with various ranges of accuracy.

Server 160 may store account credentials such as usernames and passwords associated with a particular user's account. Server 160 may also store personal information associated with each user, including the user's name, address, and payment information. Payment information may include financial account information such as a bank account or credit card number that was input by the user. Server 160 may contain a processor, memory, instructions, and data, which all may operate similarly to the components of the client computing device described above. Server computer 160 may communicate with the other devices via network 170.

Although FIG. 1 functionally illustrates the processor, memory, and other elements of computing device 120 as being within the same block, the processor, computer, computing device, or memory may actually comprise multiple processors, computers, computing devices, or memories that may or may not be stored within the same physical housing. For example, the memory may be a hard drive or other storage media located in a housing different from that of the computing device accessing the memory. Accordingly, references to a processor, computer, computing device, or memory will be understood to include references to a collection of processors, computers, computing devices, or memories that may or may not operate in parallel. For example, the computing device 160 may include a single server computing device or a load-balanced server farm. Yet further, although some functions described below are indicated as taking place on a single computing device having a single processor, various aspects of the subject matter described herein may be implemented by a plurality of computing devices, for example, communicating information over network 110.

Figure 2:
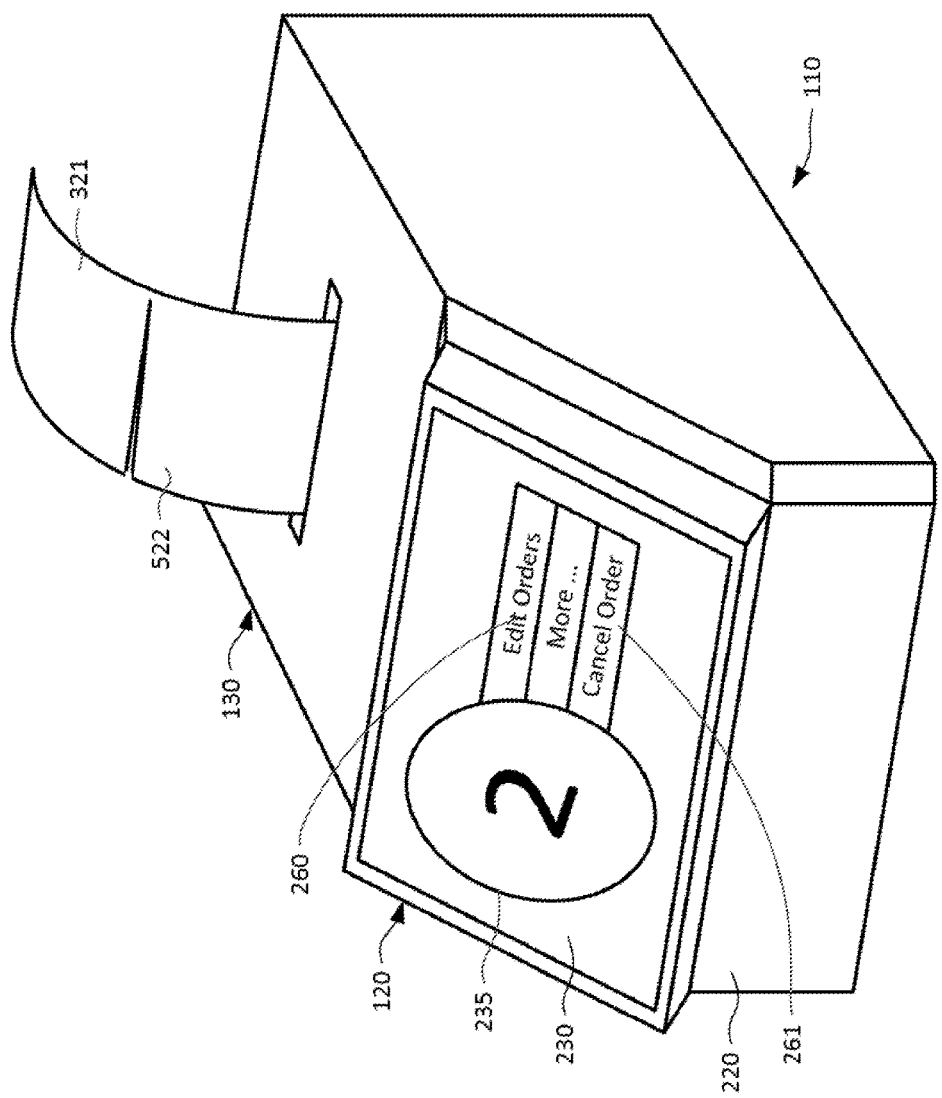
FIG. 2 is an example of an order processing system in accordance with aspects of the disclosure.

FIG. 2 illustrates one possible configuration of order processing system 110. Host computing device 120 may be a cell phone mounted to a bracket 220, which is in turn mounted to or adjacent to a receipt printer 130. Device 120 may include a touchscreen 230 for displaying information and receiving user input. Although certain advantages may be realized when the computing device 120 is physically adjacent to the printer 130, the computing device may be located proximate to, but not directly adjacent to, the printer 130. In yet other configurations, device 120 may be a mobile, wearable device that is worn by its user, the printer is stationary, and the printer indirectly or directly wirelessly communicates with the wearable device. In still another configuration, the host computing device computing device and printer may be parts of a single, integrated unit.

Various aspects of the system may be particularly advantageous when used in connection with venues that sell food or drink to patrons, such as bars and restaurants. While most of the descriptions of the system and method herein focus on facilitating the sale of drinks and tracking of inventory in bars for ease of illustration, the system and method may be used in a wide variety of applications, especially but not solely with respect to the tracking and sale of any type of inventory in a point of service application.

Operations in accordance with a variety of aspects of the invention will now be described. It should be understood that the following operations do not have to be performed in the precise order described below. Rather, various steps can be handled in a different order or simultaneously.

Figure 3:
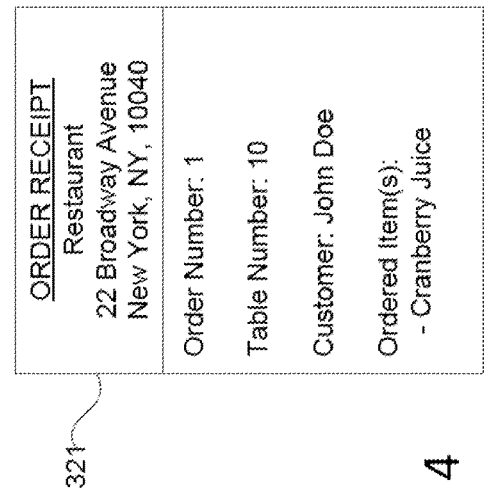
FIG. 3 is an example order being placed and transmitted in accordance with aspects of the disclosure.

While at a venue, for example, a bar or restaurant, a patron may use a computing device to order a product or service. For instance, as shown in FIG. 1, a patron 144 may access an application on client computing device 140 to place an order for a drink at a venue at which the customer is currently located. As shown in FIG. 3, the client computing device 120 may display to the customer on display 132 a list of items the user can order. In another example, the user may first be presented with categories of drink or food items to select from. For instance, if the user was to select the "beer" option, a second screen may be presented to the user which provides a list of beers offered by the bar. In this example, the user selects cranberry juice, as depicted by dotted-line box 334.

Once the user makes their selection, information describing the selection may be sent to system 110 via network 170. As illustrated in FIG. 3, the information may include a list of the ordered items (i.e., cranberry juice) and information that identifies the customer that ordered the items. The identification information may be the information associated with the account that the user logged into when opening the application as discussed above, particularly the name of the customer. In addition, the table number that the customer is sitting at may be included in the identification information as well. For instance, the table information may have been entered into the system before or after the user was prompted to select a food or drink item to order. In this regard, when a user processes the order, the user will know how to locate the customer in the bar.

As shown in FIG. 3, upon receiving the order information, order processing system 110 may print a receipt of the order. For instance, receipt 321 in FIG. 3 may contain details describing the items ordered, the customer associated with the order, and the table number.

In one aspect, the order may be transmitted to host processing device 120, which may be received by an application running on the device. The application then formats the relevant data and sends it, with print instructions and a print command, to printer 130, which in turn prints the receipt 321.

Figure 4:
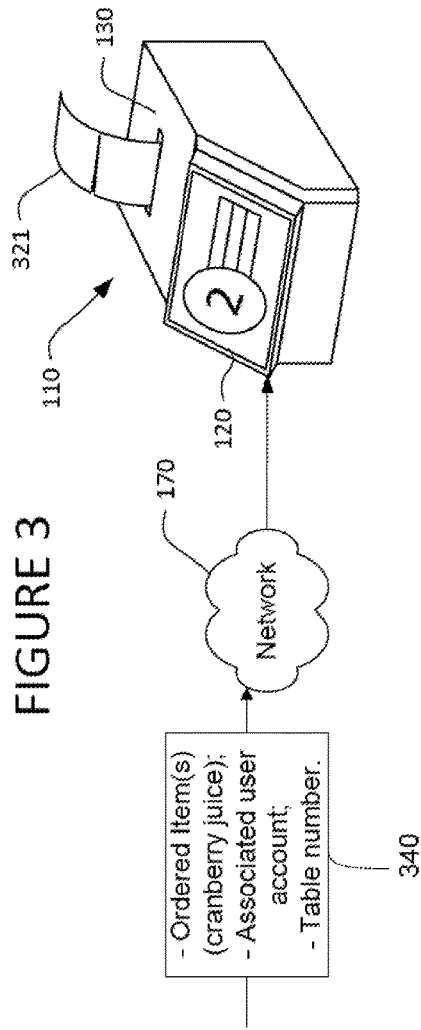
FIG. 4 is an example of a receipt in accordance with aspects of the disclosure.
Figure 4:
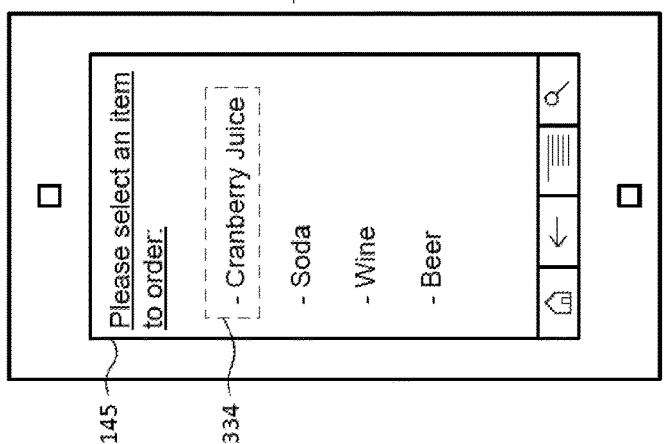

FIG. 4 is a view of the receipt which presents the details thereon. Receipt 321 may contain restaurant information such as the restaurant's name and address. The receipt may also contain the order number, table number of the customer, the customer's name, and the list of ordered items. Additional information may also be displayed on the receipt, such as, for instance, the name of the person handling that particular order.

The printer 130 may print multiple orders. In this regard, each order may contain information that corresponds to a particular customer and a particular order. For instance, referring to FIG. 5, the printer has printed three (3) receipts 321, 522, and 523 that detail orders that have been placed by various customers. Receipt 321 provides information relating to the first order, receipt 522 the second order, and receipt 523 the third order. Each customer may have placed the order in a similar manner as described above, such as by logging in and selecting a drink item.

When an order is received, the order processing system requests that a user accept the order. For instance, as shown in FIG. 2, display 230 displays an indicator 235 of how many orders are awaiting acceptance, which in this instance is two. The display 230 may be a touch-screen, indicator 235 may be a virtual button, and the user may press the indicator to indicate the user's acceptance of the two pending orders. The user may remove the two receipts 321 and 522 corresponding with those orders from printer 130.

In some aspects, the user accepts the orders one at a time, and the indicator changes accordingly. For instance, as shown in FIG. 6, the system may display at step 601 that there are two orders awaiting acceptance, as also indicated by receipts 321 and 522. The application that displays indicator 235 may interpret each tap on the indicator as a command to accept the oldest, pending order. In certain aspects, the user may select the accept button 612 by using a mouse or speaking into a microphone that indicates a selection of the accept button. In other aspects, system 110 may include a physical button on the device that is dedicated to accepting orders and, upon each press, provides an accept command to host computing device 120.

In accordance with some operations of the system, the oldest pending order may be the first order in the chain of receipts 321 and 522. When the oldest, pending order is deemed accepted, the indicator 235 will decrement the displayed number by one to indicate that there is one order remaining (step 602). The receipts may be automatically cut by the printer such that the receipts remain detachably connected to each other until physically separated by a user. In that regard, because in the example of FIG. 6 the user has only accepted the oldest order, the user may tear receipt 321 from 522 at the cut, and subsequently process the order based on the information on receipt 321. When the user is ready to process the next order, the user may again tap indicator 235, which will then indicate that there are no more remaining orders, and the user may remove receipt 522 from the system.

When the bartender accepts the order, the customer account associated with the placed order may be charged for the drink. Each customer account may contain personal information, which may include a bank or credit card account information. In this regard, once the bartender accepts the order, the account associated with the particular customer may be charged for the order. For instance and as shown in FIG. 1, when bartender 111 accepts the order, the host computing device 110 may transmit the cost of the order to server 160, which will in turn connect with and transmit the charge to the credit card company associated with the user's account.

After the user accepts the order, the user may process the order. As an example, the bartender may fill the order (e.g., make the drink) according to the details printed on the receipt, and the bartender or another employee may deliver the completed order to the customer. In that regard, the normal course of business may continue to operate once the order has been accepted on the host computing device.

In another aspect, a user may acknowledge an order by rejecting it. By way of example and as shown in FIG. 2, the user of the host computing device 120 may elect to reject orders by clicking on the "cancel order" button 261, in which case the oldest, pending order is cancelled and the number of orders awaiting acknowledgment displayed on indicator 235 is reduced by one. If receipt 321 contained the oldest order, the user could tear off and discard that receipt. The customer's bank or credit card account would typically not be charged for the rejected order.

Figure 8:
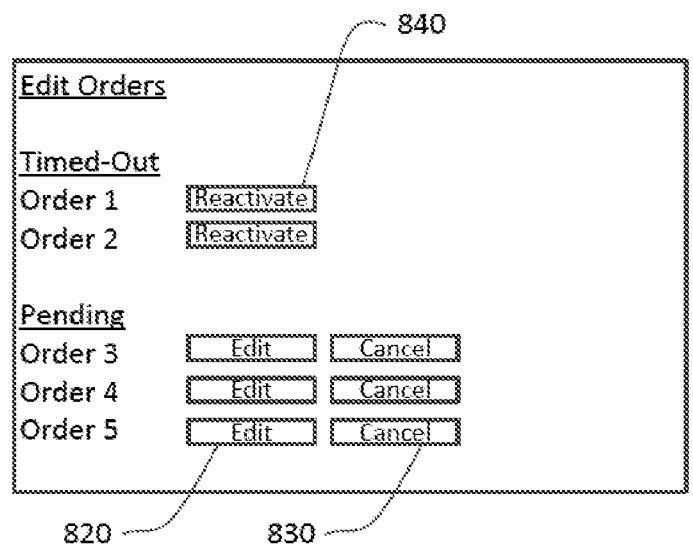
FIG. 8 is an example screen shot of a display of an order processing system in accordance with aspects of the disclosure.

In another example, the bartender may select individual orders to modify or cancel. For instance, when the bartender reviews the receipt from printer 130 for a particular order, the bartender may determine that the desired drink or food item is out of stock. In this regard, the bartender may decide to edit the order to something else, either by their own accord in exercising professional judgment or by consulting with the customer that placed the order. Upon pressing button 260, display 230 may display all pending orders, and the user may selectively modify individual orders. For instance, the computing device 120 may display a screen such as that shown in FIG. 8. By selecting button 820, the device would display the details of "Order 5," and allow the user to modify the ordered items. Alternatively and rather than editing or accepting the order, the user could select button 830 to cancel "Order 5," which, in this example, is the most recently-received order.

According to another example, when an order is not acknowledged (e.g., not accepted) within a predetermined amount of time, the order may be timed-out on the host computing device. When an order is timed-out, the order may be removed from the queue of pending orders. For instance and as shown in FIG. 7, the indicator 235 may indicate that there are two orders that have timed out (e.g., due to lack of acknowledgment) and three orders that are pending. In this regard, the host computing device 180 may prohibit the bartender from accepting the timed-out orders when the bartender clicks on the indicator 235. When the user acknowledges the cancelled orders, the user may tear the relevant number of receipts from the chain of receipts. In the example of FIG. 7, there would be a chain of five receipts at the printer, and the user may then acknowledge the cancellation by tapping indicator 235, and remove the two orders at the end of receipt. Upon acknowledging the cancelled orders, the indicator may return to displaying the number of pending orders awaiting acknowledgment.

In some aspects, the user may also selectively re-activate the timed out orders. For instance, when the bartender selects the aforementioned "edit orders" button, the display may change to the screen shown in FIG. 8. By depressing button 840, the system may change the status of "Order 1" to pending, and indicator 235 may now indicate that four orders are pending.

The color of indicator 235 may change to reflect the nature of the pending orders. For example, the indicator may be blue if no orders are pending, green if some orders are pending and no orders have timed-out, and red if one or more orders have been automatically cancelled by timing-out.

Figure 9:
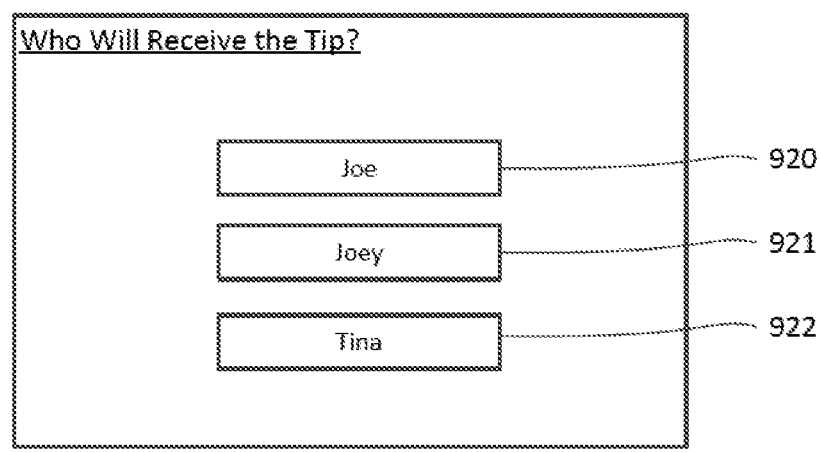
FIG. 9 is an example screen shot of a display of an order processing system in accordance with aspects of the disclosure.

When the bartender accepts an order, he or she may be prompted with an option to select the employee that will receive a tip. For instance, when the user placed the order, the user may have added money as a tip. The user may not have interacted with an employee as of the time of the order, and thus the employee that will deliver the order may not be known until the order is ready. In that regard and as shown in FIG. 9, after accepting an order, the display may prompt the user to identify the employee that should receive the tip by displaying the names of employees 920-922. When the user selects one of the names, the tip will be automatically associated with the server for subsequent payment.

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A printing system comprising:
  a printing component configured to print paper-based receipts;
  a cutting component configured to cut the paper-based receipts;
  a touchscreen display;
  a network interface;
  one or more processors in communication with the touchscreen display and the network interface; and
  a memory containing instructions executable by the one or more processors, wherein the instructions comprise:
  receiving a first identification of a first set of one or more products selected by a first user via a first device separate from the printing system,
  in response to receiving the first identification, (a) printing a description of the first set of one or more products, (b) activating the cutting component to physically cut the paper, (c) determining a first value related to the number of previously-printed receipts, and (d) displaying the first value on the touchscreen display,
  receiving a second identification of a second set of one or more products selected by a second user via a second device separate from the printing system,
  in response to receiving the second identification, (a) printing a description of the second set of one or more products, (b) activating the cutting component to physically cut the paper, (c) determining a second value by incrementing the first value, and (d) displaying the second value on the touchscreen display,
  after the second value has been displayed, determining whether a third user touched the touchscreen display at the location at which the second value is displayed, in response to determining that a third user touched the touchscreen display at the location at which the second value is displayed, (a) determining a third value by decrementing the second value and (b) displaying the third value in place of the second value.

2. The printing system of claim 1 wherein the instructions further comprise, in response to determining that the third user touched the touchscreen display at the location at which the second value is displayed, transmitting a charge to an account associated with the first user.

3. The printing system of claim 2 wherein the instructions further comprise displaying a cancel button on the touchscreen display and, in response to determining that the third user touched the touchscreen display at the location of the cancel button while the second value is displayed, determining and displaying the third value without transmitting a charge to an account associated with the first user.

4. The printing system of claim 1 wherein the instructions further comprise
- after the second value has been displayed, determining whether a user touched the touchscreen display at the location at which the third value is displayed, and
- in response to determining that a user touched the touchscreen display at the location at which the third value is displayed, (a) determining a fourth value by decrementing the third value and (b) displaying the fourth value in place of the second value.

5. The printing system of claim 4 wherein the instructions further comprise, in response to determining that a user touched the touchscreen display at the location at which the third value is displayed, transmitting a charge to an account associated with the second user.

* * * * *